US008072550B2

(12) United States Patent
Tsunoda et al.

(10) Patent No.: US 8,072,550 B2
(45) Date of Patent: Dec. 6, 2011

(54) REMOTE CONTROL UNIT

(75) Inventors: Takashi Tsunoda, Yokohama (JP);
Toshiaki Itazawa, Yamato (JP)

(73) Assignee: Canon Kabushiki Kaisha, Tokyo (JP)

( * ) Notice: Subject to any disclaimer, the term of this patent is extended or adjusted under 35 U.S.C. 154(b) by 1038 days.

(21) Appl. No.: 11/332,377

(22) Filed: Jan. 17, 2006

(65) Prior Publication Data

US 2006/0158571 A1 Jul. 20, 2006

(30) Foreign Application Priority Data

Jan. 18, 2005 (JP) ................................. 2005-010450

(51) Int. Cl.
*H04N 5/268* (2006.01)
*H04N 5/44* (2011.01)
*H04N 5/63* (2006.01)

(52) U.S. Cl. .................... 348/734; 348/706; 348/730

(58) Field of Classification Search .................. 348/730, 348/734, 705–706

See application file for complete search history.

(56) References Cited

U.S. PATENT DOCUMENTS

| 4,712,105 | A | * | 12/1987 | Kohler | 340/825.69 |
| 4,856,081 | A | * | 8/1989 | Smith | 455/151.4 |
| 5,541,647 | A | * | 7/1996 | Moon | 348/180 |
| 5,598,523 | A | * | 1/1997 | Fujita | 715/840 |
| 5,671,267 | A | * | 9/1997 | August et al. | 455/420 |
| 6,040,829 | A | * | 3/2000 | Croy et al. | 715/864 |
| 6,052,155 | A | * | 4/2000 | Cherrick et al. | 348/565 |
| 6,097,441 | A | * | 8/2000 | Allport | 348/552 |
| 6,104,334 | A | * | 8/2000 | Allport | 341/175 |
| 6,407,779 | B1 | * | 6/2002 | Herz | 348/734 |
| 6,496,122 | B2 | * | 12/2002 | Sampsell | 340/825.69 |
| 6,532,592 | B1 | * | 3/2003 | Shintani et al. | 725/141 |
| 6,535,239 | B1 | * | 3/2003 | Kim | 348/14.02 |
| 6,781,635 | B1 | * | 8/2004 | Takeda | 348/552 |
| 6,859,937 | B1 | * | 2/2005 | Narayan et al. | 725/37 |
| 6,862,741 | B1 | * | 3/2005 | Grooters | 725/39 |
| 6,917,349 | B2 | * | 7/2005 | McGowan et al. | 345/30 |
| 6,985,069 | B2 | * | 1/2006 | Marmaropoulos | 340/3.9 |
| 7,057,523 | B2 | * | 6/2006 | Lin et al. | 340/825.69 |
| 7,095,456 | B2 | * | 8/2006 | Nakajima | 348/734 |
| 7,113,224 | B2 | | 9/2006 | Inoue et al. | 348/565 |
| 7,123,246 | B2 | * | 10/2006 | Nakatani et al. | 345/204 |
| 7,154,408 | B2 | * | 12/2006 | Ku et al. | 340/815.6 |
| 7,200,853 | B2 | * | 4/2007 | Kawai | 725/34 |
| 7,236,208 | B2 | * | 6/2007 | Eaton et al. | 348/553 |
| 7,317,495 | B2 | * | 1/2008 | Takahashi | 348/838 |
| 7,360,232 | B2 | * | 4/2008 | Mitchell | 725/112 |
| 7,483,574 | B2 | * | 1/2009 | Sasaki | 382/232 |
| 2002/0036626 | A1 | * | 3/2002 | Tsutsui | 345/204 |
| 2002/0093449 | A1 | * | 7/2002 | Lin | 341/176 |

(Continued)

FOREIGN PATENT DOCUMENTS

JP 2001-103334 4/2001

*Primary Examiner* — Brian Yenke

(74) *Attorney, Agent, or Firm* — Fitzpatrick, Cella, Harper & Scinto

(57) ABSTRACT

A remote control unit capable of bidirectionally communicating with a display apparatus, such as a television set. The remote control unit comprises a display unit adapted to display an image transmitted from the display apparatus, a detector unit adapted to detect a state of a power supply of the remote control unit, and a switching unit adapted to switch a display mode of the display unit from a moving image mode to a still image mode, according to the state of the power supply.

4 Claims, 12 Drawing Sheets

U.S. PATENT DOCUMENTS

| | | | |
|---|---|---|---|
| 2002/0167503 A1 | 11/2002 | Tsunoda et al. | 345/204 |
| 2003/0030607 A1* | 2/2003 | Kitagawa et al. | 345/87 |
| 2003/0095212 A1* | 5/2003 | Ishihara | 348/734 |
| 2003/0099456 A1* | 5/2003 | Ohmura et al. | 386/46 |
| 2004/0066308 A1* | 4/2004 | Sampsell | 340/825.69 |
| 2004/0160532 A1* | 8/2004 | Sun | 348/559 |
| 2004/0212732 A1 | 10/2004 | Matsuzaki et al. | 348/452 |
| 2005/0114901 A1 | 5/2005 | Yui et al. | 725/100 |
| 2006/0109384 A1* | 5/2006 | Miller-Smith et al. | 348/730 |
| 2006/0158571 A1 | 7/2006 | Tsunoda et al. | 348/734 |
| 2006/0203130 A1 | 9/2006 | Inoue et al. | 348/738 |
| 2007/0152964 A1* | 7/2007 | Nashida et al. | 345/156 |

* cited by examiner

REMOTE CONTROL UNIT

BACKGROUND OF THE INVENTION

1. Field of the Invention

The present invention relates to a bidirectional remote control unit capable of bidirectionally communicating with a display apparatus, such as a television set.

2. Description of the Related Art

A conventional bidirectional remote control unit is configured to be capable of shifting information concerning operations to be performed on the screen of a television set onto a display device of the bidirectional remote control unit itself, for execution of the operations thereon, whereby a viewer's convenience is improved to enhance the commercial value of the television set.

Further, there has been proposed a bidirectional remote control unit for operating a video apparatus, which is capable of displaying reproduction information on a recorded magnetic tape in the video apparatus, and which includes a changeover switch for selecting between display and non-display of images (see, e.g., Japanese Laid-Open patent Publication (Kokai) No. 2001-103334).

A bidirectional remote control unit of the above-mentioned type is provided with a built-in secondary battery as a power supply.

However, in the conventional bidirectional remote control unit, the capacity of the secondary battery is small relative to the power consumption of the bidirectional remote control unit, and hence the voltage of the secondary battery tends to soon become lower than a predetermined level. To eliminate this inconvenience, a bidirectional remote control unit capable of controlling the power consumption thereof is currently demanded. The above-mentioned problem occurs not only when a secondary battery is used, but also when a primary battery, which is unrechargeable, is used.

Further, a video image is sent from the controlled apparatus to the bidirectional remote control unit by wireless transmission using infrared rays, and hence when the state of transmission become worse, the error rate of the video image increases, which causes disturbance of the video image displayed on the remote control unit. Furthermore, if reception sensitivity is enhanced so as to improve the transmission state at all, the power consumption of the bidirectional remote control unit increases. Therefore, there is currently a demand for a bidirectional remote control unit capable of controlling the power consumption thereof by taking the state of transmission into consideration.

SUMMARY OF THE INVENTION

The present invention is to overcome the above-described drawbacks.

To attain the above object, the present invention provides a remote control unit capable of bidirectionally communicating with a display apparatus, comprising: a display unit adapted to display an image transmitted from the display apparatus; a detector unit adapted to detect a state of a power supply of the remote control unit; and a switching unit adapted to switch a display mode of the display unit from a moving image mode to a still image mode, according to the state of the power supply.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the present invention and, together with the description, serve to explain the principles of the present invention.

DETAILED DESCRIPTION OF THE PREFERRED EMBODIMENTS

Preferred embodiments of the present invention will be described in detail below with reference to the drawings.

First Embodiment

First, a description will be given of a first embodiment of the present invention.

Figure 1:
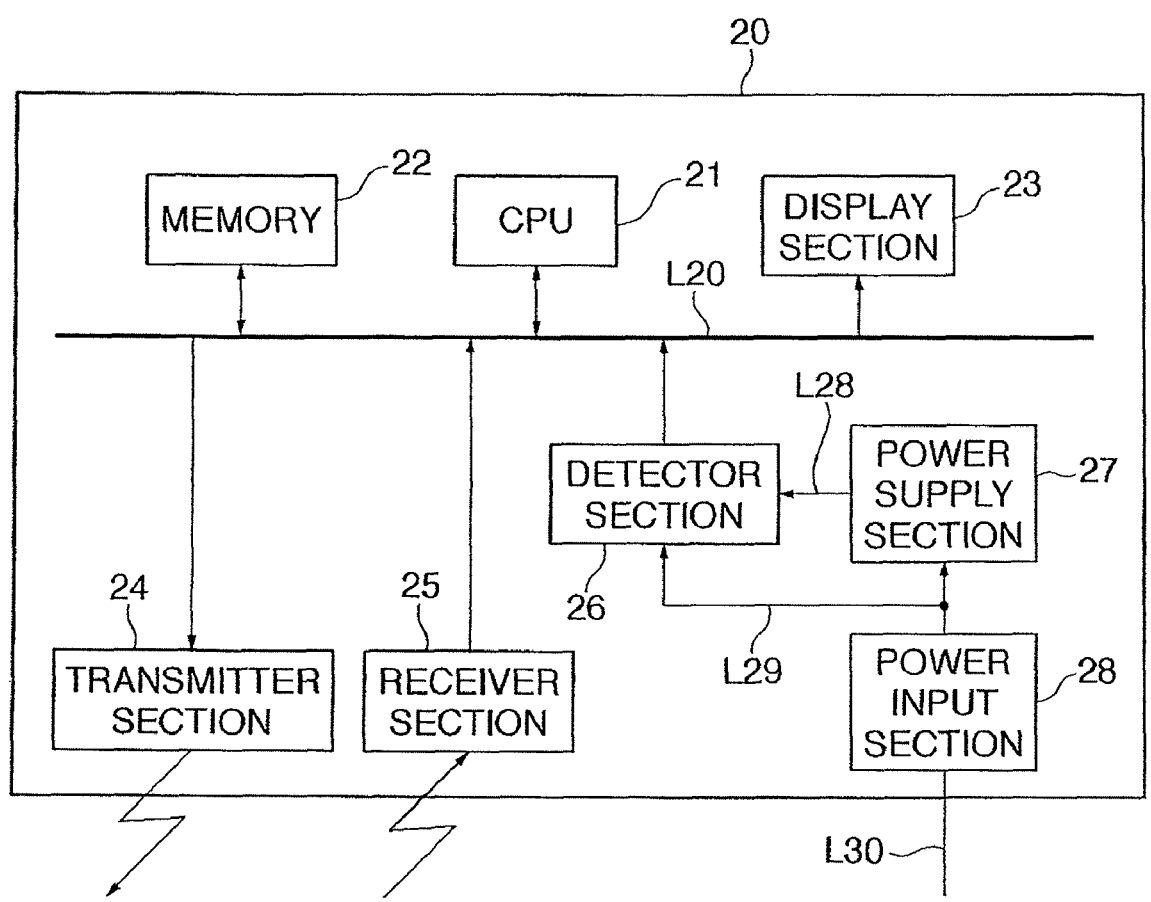
FIG. 1 is a block diagram showing the internal configuration of a bidirectional remote control unit according to a first embodiment of the present invention.

FIG. 1 is a block diagram showing the internal configuration of a bidirectional remote control unit according to a first embodiment of the present invention.

As shown in FIG. 1, the bidirectional remote control unit 20 includes a power supply section 27 comprised of a secondary battery, and a power input section 28 provided with a power jack for supplying electric power from an external power supply, such as an AC adaptor, to the power supply section 27 via a power supply line L30. Further, the bidirectional remote control unit 20 includes a CPU (Central Processing Unit) 21, a memory 22 that stores data used by the CPU 21 and is used in processing video signals by the CPU 21, a transmitter section 24 that transmits signals designating a selected program or channel, brightness, contrast, and sound volume of a television set, described in detail hereinafter with reference to FIG. 2, and the charged state of an internal battery, and other command signals to the television set under the control of the CPU 21, a receiver section 25 that receives command signals and video and audio signals transmitted from the television set, a display section 23 that displays images received from the television set, and a detector section 26 connected to the power supply section 27 via a signal line L28, for detecting the voltage level of the power supply section 27. The above-mentioned sections are connected to each other via a signal line L20.

Figure 2:
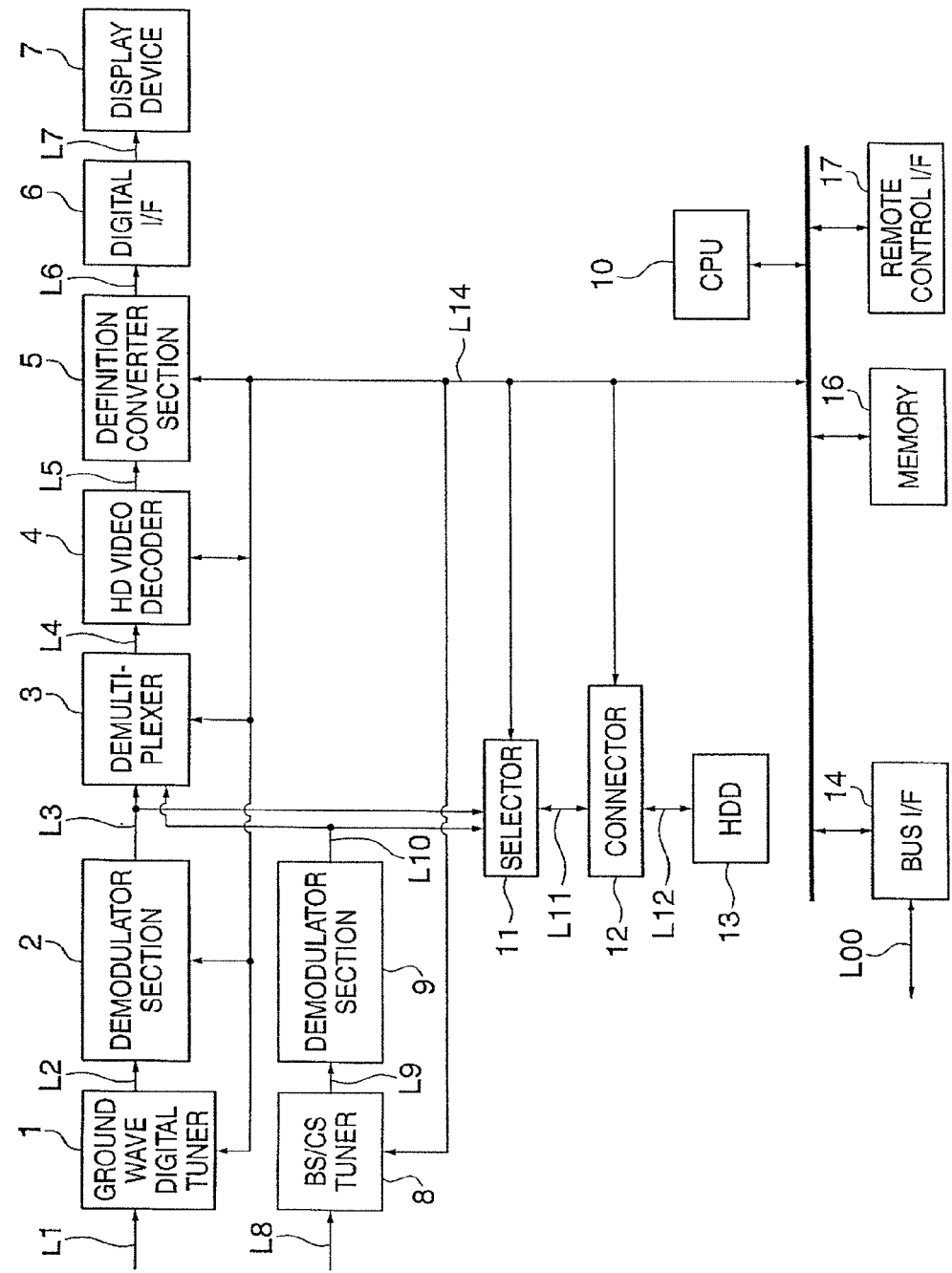
FIG. 2 is a block diagram showing the internal configuration of a television set operated by the bidirectional remote control unit in FIG. 1.

FIG. 2 is a block diagram showing the internal configuration of the television set operated by the bidirectional remote control unit in FIG. 1.

In FIG. 2, a ground wave digital tuner 1 receives airwaves carrying ground wave digital broadcasting signals through a ground antenna, and passes a selected one of the signals through a band filter, to output a filtered signal to a demodulator section 2 via a signal line L2. The demodulator section 2 subjects the filtered signal to a demodulation process suitable for the mode of transmission thereof, and at the same time carries out an error-correcting process, to deliver a desired MPEG-2 transport stream (T/S) to a demultiplexer (DEMUX) 3 via a signal line L3.

On the other hand, a BS/CS tuner 8 receives satellite waves carrying satellite digital broadcasting signals from a parabolic antenna, via a signal line L8, and passes a selected one of the signals through a down converter, etc. to output the down-converted signals to a demodulator section 9 via a signal line L8. The demodulator section 9 subjects the signals to a demodulation process suitable for the mode of transmission thereof, and at the same time carries out an error-correcting process, to deliver a desired MPEG-2 transport stream (T/S) to the demultiplexer (DEMUX) 3 via a signal line L10.

The demultiplexer 3 separates the transport stream of the desired program into MPEG-2 video data, MPEG-2 audio data, and additional information. The separated MPEG-2 audio data is decoded by an audio decoder, and then output from speakers. Therefore, the sound of the received program becomes audible.

The HD video decoder 4 decodes the MPEG-2 video data input via a signal line L4, and after converting the decoded data into a raster scan display format, delivers the video data as a program video source to a definition converter section 5 via a signal line L5.

The definition converter section 5 converts YUV color difference signals to RGB signals using a matrix circuit, and after converting the scanning method from interlace scanning to progressive scanning using an I-P converter circuit, performs a magnifying/reducing/non-magnifying process using definition conversion parameters (a magnification ratio, a reduction ratio, weighting filter coefficients for magnification/reduction, etc.) set based on a display format (the number of display lines, the number of dots, the number of colors) and preset screen layout information, and delivers the processed signals to a digital I/F 6 via a signal line L6. The digital I/F 6 converts the image data into a format corresponding to the definition of the image data, and then delivers the image data to a display device 7 via a signal line L7.

The MPEG-2 transport streams (T/S) output from the demodulator sections 2 and 9, respectively, are stored in a removable storage device (HDD) 13 via a selector 11 and a connector 12 under the control of the CPU 10, and are called up as required.

The selector 11 selects one of the demodulator section 2 and the demodulator section 9 under the control of the CPU 10. The connector 12 is a bidirectional interface for controlling the HDD 13.

A bus I/F 14 is a network interface provided with a transmission and reception function for transmitting image data stored in the HDD 13 to an external device or apparatus via a signal line L00 and receiving image data from an external device or apparatus via the signal line L00, under the control of the CPU 10. The image data stored in the HDD 13 is transferred to the demultiplexer 3 via signal lines L12 and L11 and then transmitted to the external device or apparatus via the HD video decoder 4, a signal line L14, and the bus I/F 14. The bus I/F 14 may be either a wired interface or a wireless interface (IEEE Std 802.11).

The memory 16 is used as a storage device for the CPU 10. A remote control I/F 17 is capable of bidirectionally communicating with the remote control unit 20, and receiving commands for selecting a program or a channel, adjusting volume, turning ON/OFF the power, adjusting contrast, and so forth, from the remote control unit 20. Further, the remote control I/F 17 is capable of transmitting, under the control of the CPU 10, a video signal of a program received by the ground wave digital tuner 1 or the BS/CS tuner 8, and so forth to the remote control unit 20.

In the following, a description will be given of the operation of the bidirectional remote control unit in FIG. 1 and that of the television set in FIG. 2.

In FIGS. 1 and 2, the detector section 26 of the bidirectional remote control unit 20 constantly monitors the voltage level of the power supply section 27. When electric power is supplied to the power input section 28 from an external power supply, such as an AC adapter, via the power supply line L30, electric power is supplied to the power supply section 27 via a signal line L29. The detector section 26 monitors the level of voltage on the signal line L28 to determine whether the secondary battery of the power supply section 27 is fully charged, or being charged or losing voltage. If the voltage is at or higher than a predetermined level, the detector section 26 determines that the secondary battery of the power supply section 27 is fully charged, whereas if the voltage is lower than the predetermined level, the detector section 26 determines that the secondary battery of the power supply section 27 is being charged or losing voltage.

It should be noted that whether the secondary battery of the power supply section 27 is being charged or losing voltage is determined based on the level of voltage on the signal line L29 monitored by the detector section 26. More specifically, if the voltage on the signal line L29 is not lower than a predetermined level, it is determined that the bidirectional remote control unit 20 is currently driven by the external power supply or the secondary battery of the power supply section 27 is being charged, whereas if the voltage on the signal line L29 is lower than the predetermined level, it is determined that the secondary battery is losing voltage. Therefore, "the secondary battery is losing voltage" implies that the bidirectional remote control unit 20 is currently driven by the rechargeable secondary battery alone.

If the bidirectional remote control unit 20 is being directly driven by the external power supply (the power supply section 27 is being charged at the same time), the CPU 21 recognizes a signal from the detector section 26 via the signal line L20. As a consequence, the CPU 21 notifies the transmitter section 24 via the signal line L20 that the bidirectional remote control unit 20 is currently driven in a fully charged state or in a charged state, and the transmitter section 24 wirelessly transmits a command indicative of the fact to the remote control I/F 17 of the television set.

The CPU 10 of the television set analyzes this command, and waits for a succeeding command to be sent from the bidirectional remote control unit 20. If no command is sent from the bidirectional remote control unit 20 within a predetermined time period, the received command is regarded as invalid. On the other hand, if a command is received within the predetermined time period, the immediately preceding command is regarded as valid, and the following processing is executed:

If the command designates a broadcast program of a ground wave digital broadcasting, for example, the CPU 10 causes the ground wave digital tuner 1 to select a channel broadcasting the program, via the signal line L14.

The video of the selected program is delivered onto the signal line L14 via the demodulator section 2, the demultiplexer 3, the HD video decoder 4, and the definition converter section 5, and a video signal of the program is wirelessly sent to the receiver section 25 of the bidirectional remote control unit 20 via the remote control I/F 17. The video signal received by the receiver section 25 is processed by the CPU 21 into a display format adapted to the definition of the display section 23, and is displayed thereon.

In the case where the bidirectional remote control unit 20 is currently driven by the secondary battery of the power supply section 27 alone, if the detector section 26 detects that the voltage level of the power supply section 27 has been lowered to a level below the predetermined value, the CPU 21 transmits a command indicative of insufficient voltage for driving the bidirectional remote control unit 20 to the remote control I/F 17 via the transmitter section 24, and the CPU 10 of the television set receives the command, whereby serial transmission of the video information (signal) which has been continuously transmitted to the bidirectional remote control unit 20 via the remote control I/F 17 so far is changed to frame-by-frame advancing transmission of still images at arbitrary intervals (still image transmission).

On the other hand, the bidirectional remote control unit 20 displays thinned frames of image information (still images) in the same process as the moving image has been displayed, which completes a series of operations.

Figure 3:
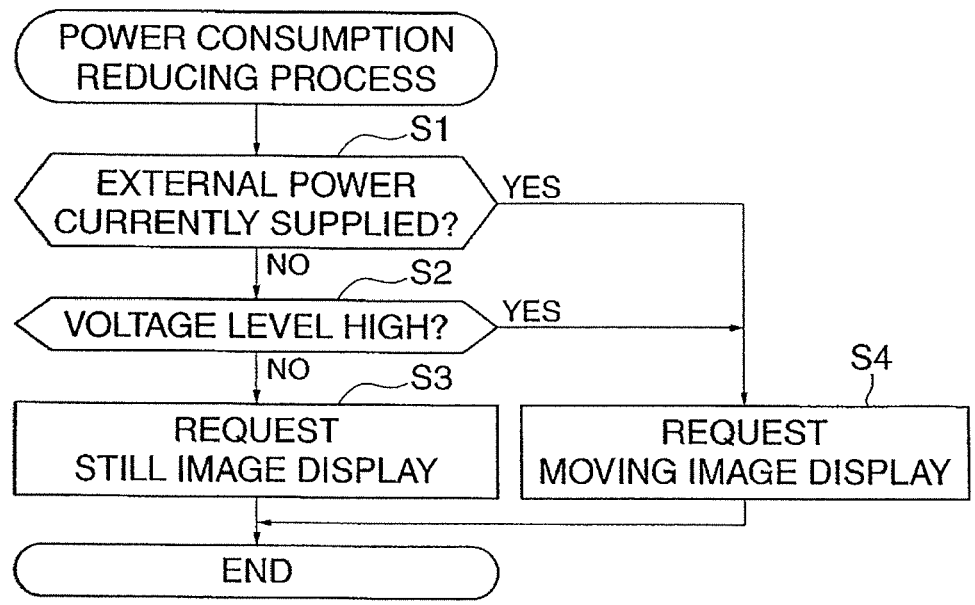
FIG. 3 is a flowchart showing a power consumption reducing process which is executed by the bidirectional remote control unit in FIG. 1.

FIG. 3 is a flowchart showing a power consumption reducing process which is executed by the bidirectional remote control unit in FIG. 1.

As shown in FIG. 3, first, it is determined whether or not external power is currently supplied to the power input section 28 in the bidirectional remote control unit 20, i.e., whether or not electric power is currently supplied e.g. from the AC adapter via the power supply line L30 to keep the voltage on the signal line L29 not lower than the predetermined level (step S1). If the voltage on the signal line L29 is not lower than the predetermined level, it is determined that the external power is currently supplied, and the bidirectional remote control unit 20 transmits a command requesting moving image display to the television set. The television set analyzes the received command by the CPU 10, and transmits the moving image of a video program selected in the television set to the bidirectional remote control unit 20 (step S4), followed by terminating the present process.

If the voltage is lower than the predetermined level in the step S1, it is determined that external power is not supplied, and the voltage level of the power supply section 27 is detected by the detector section 26 via the signal line L28 (step S2). If the voltage of the power supply section 27 is not lower than the predetermined level, the CPU 21 determines that the secondary battery of the power supply section 27 is sufficiently charged, and issues a request for moving image display so as to cause the television set to transmit a moving image (step S4), followed by terminating the present process.

On the other hand, if the voltage is lower than the predetermined level in the step S2, it is determined that the electric charge in the secondary battery of the power supply section 27 is insufficient, and the bidirectional remote control unit 20 transmits a command requesting still image display to the television set. The television set analyzes the received command by the CPU 10, and transmits a still image instead of a moving image to the bidirectional remote control unit 20 (step S3), followed by terminating the present process.

As described above, according to the power consumption reducing process in FIG. 3, when the electric charge in the secondary battery of the power supply section 27 in the bidirectional remote control unit 20 is insufficient (NO to the step S2), the bidirectional remote control unit 20 transmits the command requesting still image display to the television set to thereby cause the television set to transmit a still image instead of a moving image, (step S3), so that it is possible to reduce the power consumption of the bidirectional remote control unit 20.

Figure 4:
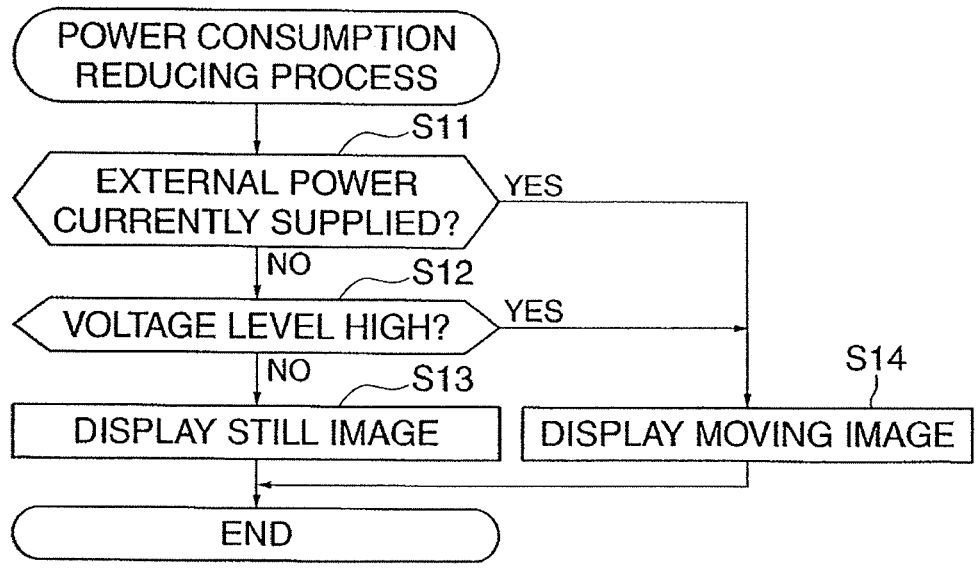
FIG. 4 is a flowchart showing a variation of the power consumption reducing process in FIG. 3.

FIG. 4 is a flowchart showing a variation of the power consumption reducing process in FIG. 3.

As distinct from the process in FIG. 3, in which the bidirectional remote control unit 20 constantly monitors the voltage of the secondary battery thereof, and transmits a command requesting the distribution of a moving image or a command requesting the distribution of a still image, to the television set, according to the state of voltage supplied to the secondary battery, in the present variation, the bidirectional remote control unit 20 constantly receives a moving image from the television set and switches between moving image display and still image display according to the state of voltage supplied to the secondary battery.

The hardware configuration of the present variation is basically the same as that shown in FIG. 2.

Referring to FIG. 4, first, it is determined whether or not external power is currently supplied to the power input section 28 in the bidirectional remote control unit 20, i.e., whether or not electric power is currently supplied, e.g., from the AC adapter via the power supply line L30 to keep the voltage on the signal line L29 not lower than the predetermined level (step S11). If the voltage on the signal line L29 is not lower than the predetermined level, it is determined that the external power is currently supplied, and the bidirectional remote control unit 20 receives a moving image from the television set via the receiver section 25 and displays the same on the display section 23 (step S14), followed by terminating the present process.

If the voltage on the signal line L29 is lower than the predetermined level in the step S11, it is determined that external power is not supplied, and the voltage level of the power supply section 27 is detected by the detector section 26 via the signal line L28 (step S12). If the voltage level of the power supply section 27 is not lower than the predetermined voltage, the CPU 21 determines that the secondary battery of the power supply section 27 is sufficiently charged, and receives a moving image signal from the television set via the receiver section 25 and carries out moving image display processing for displaying the moving image on the display section 23 (step S14), followed by terminating the present process.

On the other hand, if the voltage level is lower than the predetermined voltage in the step S12, it is determined that the electric charge in the secondary battery of the power supply section 27 is insufficient, and the bidirectional remote control unit 20 receives a moving image signal from the television set via the receiver section 25, but discontinues the moving image display processing for displaying the moving image on the display section 23, and once stores the received moving image signal in the memory 22. Then, after the lapse of a predetermined time-period, the bidirectional remote control unit 20 fetches the moving image signal from the memory 22 and displays a still image on the display section 23 based on the moving image signal (step S13), followed by terminating the present process.

The bidirectional remote control unit 20 ignores the moving image signal received from the television set during the still image display, without storing the same in the memory 22. When the supply of external power is resumed during the still image display, the present process shifts from the still image display processing to the moving image display processing (step S14).

As described above, according to the power consumption reducing process in FIG. 4, when the electric charge in the secondary battery of the power supply section 27 in the bidirectional remote control unit 20 is insufficient (NO to the step S12), the bidirectional remote control unit 20 receives a moving image signal from the television set via the receiver section 25, but discontinues the moving image display processing for displaying a moving image on the display section 23, and once stores the received moving image signal in the memory 22. Then, after the lapse of a predetermined time period, the bidirectional remote control unit 20 fetches the moving image signal from the memory 22 and displays a still image on the display section 23 based on the moving image signal (step S13). Therefore, it is possible to reduce the power consumption of the bidirectional remote control unit 20.

Figure 5:
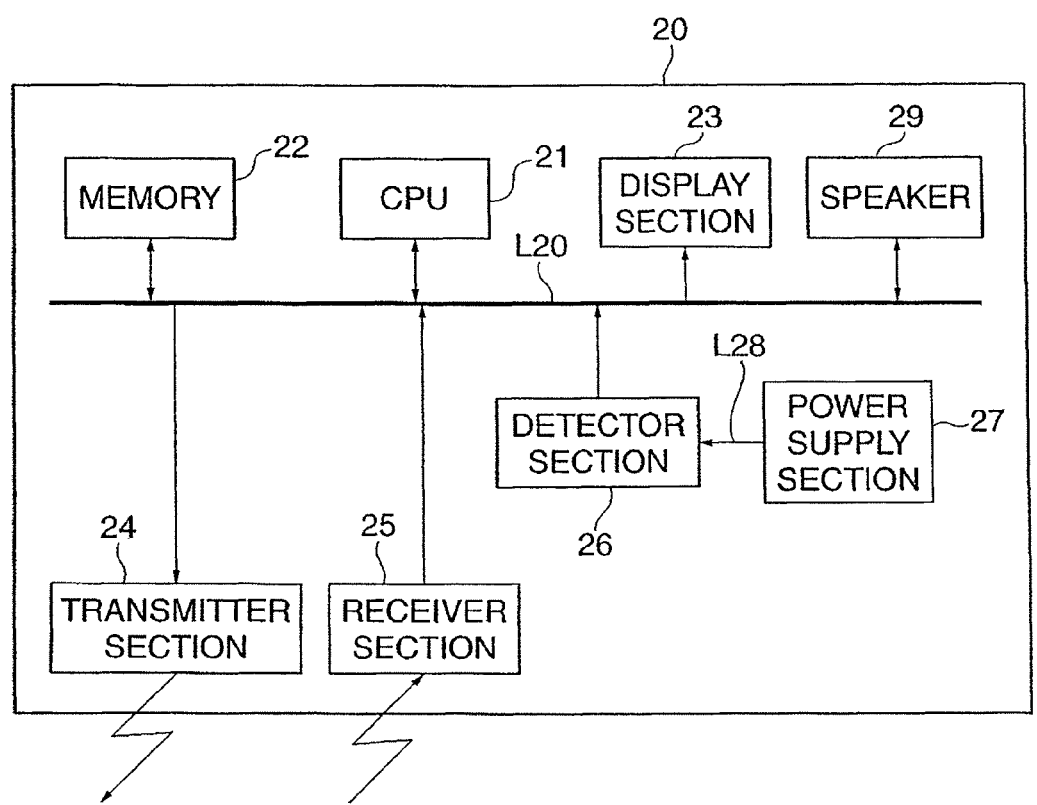
FIG. 5 is a block diagram showing the internal configuration of a variation of the bidirectional remote control unit in FIG. 1.

FIG. 5 is a block diagram showing the internal configuration of a variation of the bidirectional remote control unit in FIG. 1.

As distinct from the bidirectional remote control unit in FIG. 1, in which the power supply section 27 is implemented by a secondary battery, which is rechargeable, in this present variation, a primary battery, which is unrechargeable, is employed.

The bidirectional remote control unit in FIG. 5 has basically the same hardware configuration as that of the bidirectional remote control unit in FIG. 1 except that since the power supply section 27 is implemented by the primary battery, the power input section 28 is not provided, and a speaker 29 is provided for sounding an alarm when the voltage of the primary battery has lowered.

In the following, a description will be given of the operation of the bidirectional remote control unit in FIG. 5 and that of the television set in FIG. 2.

In FIGS. 5 and 2, the detector section 26 of the bidirectional remote control unit 20 constantly monitors the voltage level of the power supply section 27. The detector section 26 monitors the level of voltage on the signal line L28 to determine whether or not the voltage is at or higher than a predetermined level. If the voltage level is at or higher than the predetermined level, the detector section 26 determines that the primary battery of the power supply section 27 is in a state capable of driving the bidirectional remote control unit 20 for moving image display, whereas if the voltage is lower than the predetermined level, the detector section 26 determines that the primary battery of the power supply section 27 is in a state capable of driving the bidirectional remote control unit 20 for still image display, or incapable of approaching a state incapable of driving the bidirectional remote control unit 20.

If the bidirectional remote control unit 20 is currently driven by the primary battery in a favorable state, the CPU 21 recognizes a signal from the detector section 26 via the signal line L20. As a consequence, the CPU 21 notifies the transmitter section 24 via the signal line L20 that the bidirectional remote control unit 20 is currently driven in a favorable state, and the transmitter section 24 wirelessly transmits a command indicative of the fact to the remote control I/F 17 of the television set.

The CPU 10 of the television set analyzes this command, and waits for a succeeding command to be sent from the bidirectional remote control unit 20. If no command is sent from the bidirectional remote control unit 20 within a predetermined time period, the received command is regarded as invalid. On the other hand, if a command is received within the predetermined time period, the immediately preceding command is regarded as valid, and the following processing is executed:

If the command designates a broadcast program of a ground digital video, for example, the CPU 10 causes the ground wave digital tuner 1 to select a channel broadcasting the program, via the signal line L14.

The video of the selected program is delivered onto the signal line L14 via the demodulator section 2, the demultiplexer 3, the HD video decoder 4, and the definition converter section 5, and a video signal of the program is wirelessly sent to the receiver section 25 of the bidirectional remote control unit 20 via the remote control I/F 17. The video signal received by the receiver section 25 is processed by the CPU 21 into a display format adapted to the definition of the display section 23, and displayed thereon.

If the detector section 26 detects that the voltage level of the power supply section 27 has been lowered to a level below the predetermined value, the CPU 21 transmits a command indicative of insufficient voltage for driving the bidirectional remote control unit 20 to the remote control I/F 17 via the transmitter section 24, and the CPU 10 of the television set receives the command, whereby serial transmission of the video information (signal) which has been continuously transmitted to the bidirectional remote control unit 20 via the remote control I/F 17 so far is changed to frame-by-frame advancing transmission of still images at arbitrary intervals (still image transmission).

On the other hand, the bidirectional remote control unit 20 displays thinned frames of image information (still images) in the same process as the moving image has been displayed, which completes a series of operations.

Figure 6:
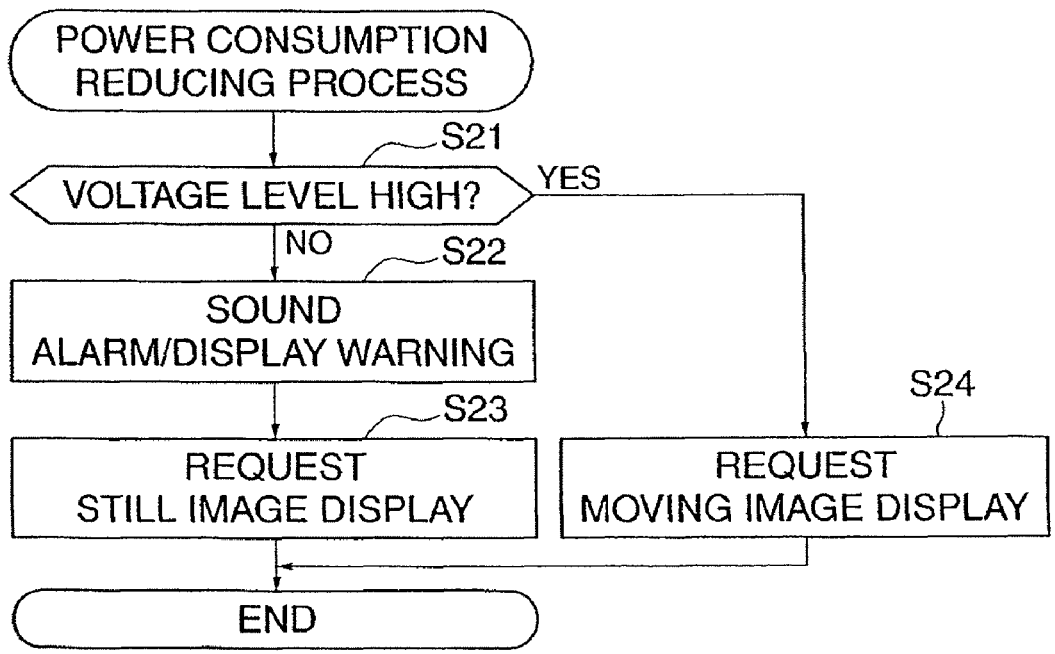
FIG. 6 is a flowchart showing a power consumption reducing process which is executed by the bidirectional remote control unit in FIG. 5.

FIG. 6 is a flowchart showing a power consumption reducing process which is executed by the bidirectional remote control unit in FIG. 5.

As shown in FIG. 6, first, it is determined whether or not the electric charge in the primary battery of the power supply section 27 in the bidirectional remote control unit 20 is sufficient, i.e. whether or not the level of the voltage on the signal line L28, for example, is not lower than the predetermined value (step S21). If the voltage on the signal line L28 is not lower than the predetermined level, it is determined that the electric charge in the primary battery is sufficient, and the bidirectional remote control unit 20 transmits a command requesting moving image display to the television set. The television set analyzes the received command in the CPU 10, and transmits the moving image of a video program selected in the television set to the bidirectional remote control unit 20 (step S24), followed by terminating the present process.

If the voltage is lower than the predetermined level in the step S21, it is determined that the electric charge in the primary battery is not sufficient, and the CPU 21 causes the speaker 29 to sound an alarm or the display section 23 to display a warning, so as to warn the user to replace the primary battery promptly (step S22). Then, the bidirectional remote control unit 20 transmits a command requesting still image display to the television set. The television set analyzes the received command by the CPU 10, and transmits a still image instead of a moving image, to the bidirectional remote control unit 20 (step S23), followed by terminating the present process.

As described above, according to the power consumption reducing process in FIG. 6, when the electric charge in the primary battery of the power supply section 27 of the bidirectional remote control unit 20 is insufficient (NO to the step S21), the CPU 21 causes the speaker 29 to sound an alarm or the display section 23 to display a warning, so as to warn the user to replace the primary battery promptly (step S22), and then the bidirectional remote control unit 20 transmits the command requesting still image display to the television set to thereby cause the television set to transmit a still image instead of a moving image (step S23), so that it is possible not only to reduce the power consumption of the bidirectional remote control unit 20, but also to replace the primary battery promptly.

Warning display in the step S22 may be performed by an LED additionally provided in the bidirectional remote control unit 20. This also applies to examples described below.

Figure 7:
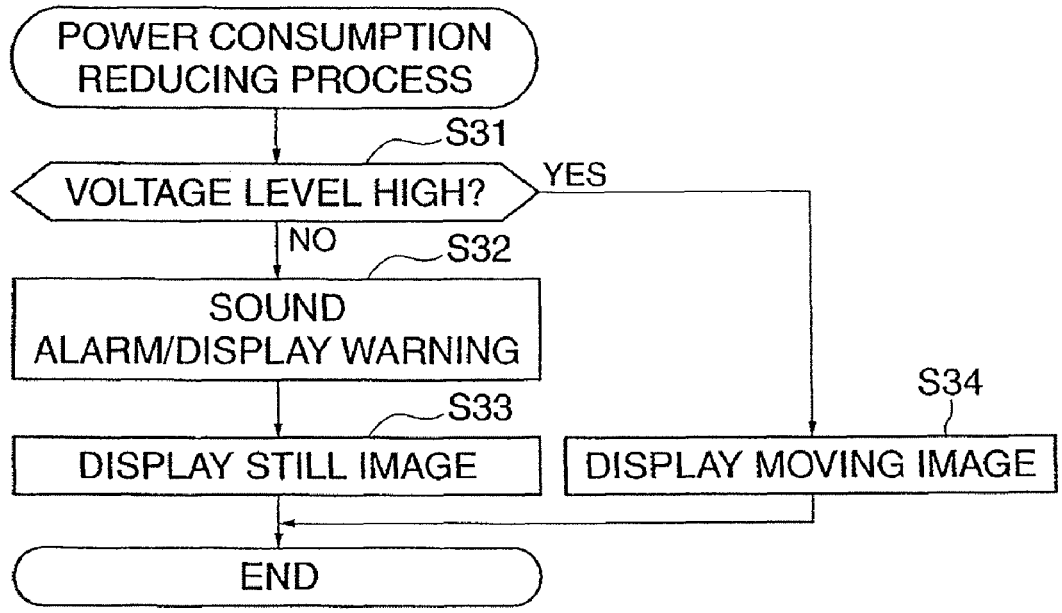
FIG. 7 is a flowchart showing a variation of the power consumption reducing process in FIG. 6.

FIG. 7 is a flowchart showing a variation of the power consumption reducing process in FIG. 6.

As is distinct from the process in FIG. 6, in which the bidirectional remote control unit 20 constantly monitors the voltage of the primary battery thereof and transmits a command requesting the distribution of a moving image or a command requesting the distribution of a still image to the television set according to the state of the voltage of the primary battery, in the present variation, the bidirectional remote control unit 20 constantly receives a moving image from the television set and switches between moving image display and still image display according to the state of the voltage of the primary battery.

As shown in FIG. 7, first, it is determined whether or not the electric charge in the primary battery of the power supply section 27 in the bidirectional remote control unit 20 is sufficient, i.e. whether or not the voltage on the signal line L28, for example, is not lower than the predetermined level (step S31). If the voltage on the signal line L28 is not lower than the predetermined level, it is determined that the electric charge in the primary battery is sufficient, and the bidirectional remote control unit 20 receives a moving image from the television set via the receiver section 25 and displays the same on the display section 23 (step S34), followed by terminating the present process.

If the voltage on the signal line L28 is lower than the predetermined level in the step S31, it is determined that the electric charge in the primary battery is insufficient, and the CPU 21 causes the speaker 29 to sound an alarm or the display section 23 to display a warning, so as to warn the user to replace the primary battery promptly (step S32). Then, the bidirectional remote control unit 20 receives the moving image signal from the television set via the receiver section 25, but discontinues the moving image display processing for displaying a moving image on the display section 23, and once stores the received moving image signal in the memory 22. Then, after the lapse of a predetermined time period, the bidirectional remote control unit 20 fetches the moving image signal from the memory 22 and displays a still image on the display section 23 based on the moving signal (step S33), followed by terminating the present process.

The bidirectional remote control unit 20 ignores the moving image signal received from the television set during the still image display, without storing the same in the memory 22.

As described above, according to the power consumption reducing process in FIG. 7, when the voltage of the primary battery of the power supply section 27 in the bidirectional remote control unit 20 is insufficient (NO to the step S31), the CPU 21 causes the speaker 29 to sound an alarm or the display section 23 to display a warning, so as to warn the user to replace the primary battery promptly (step S32). Thereafter, the bidirectional remote control unit 20 receives the moving image signal from the television set via the receiver section 25, but discontinues the moving image display processing for displaying the moving image on the display section 23, and once stores the received moving image signal in the memory 22. Then, after the lapse of a predetermined time period, the bidirectional remote control unit 20 fetches the moving image signal from the memory 22 and displays a still image on the display section 23 (step S33) based on the moving image signal. Therefore, it is possible not only to reduce the power consumption of the bidirectional remote control unit 20, but also to replace the primary battery promptly.

Second Embodiment

Next, a description will be given of a second embodiment of the present invention. It should be noted that description of the second embodiment similar to those of the first embodiment is omitted.

Figure 8:
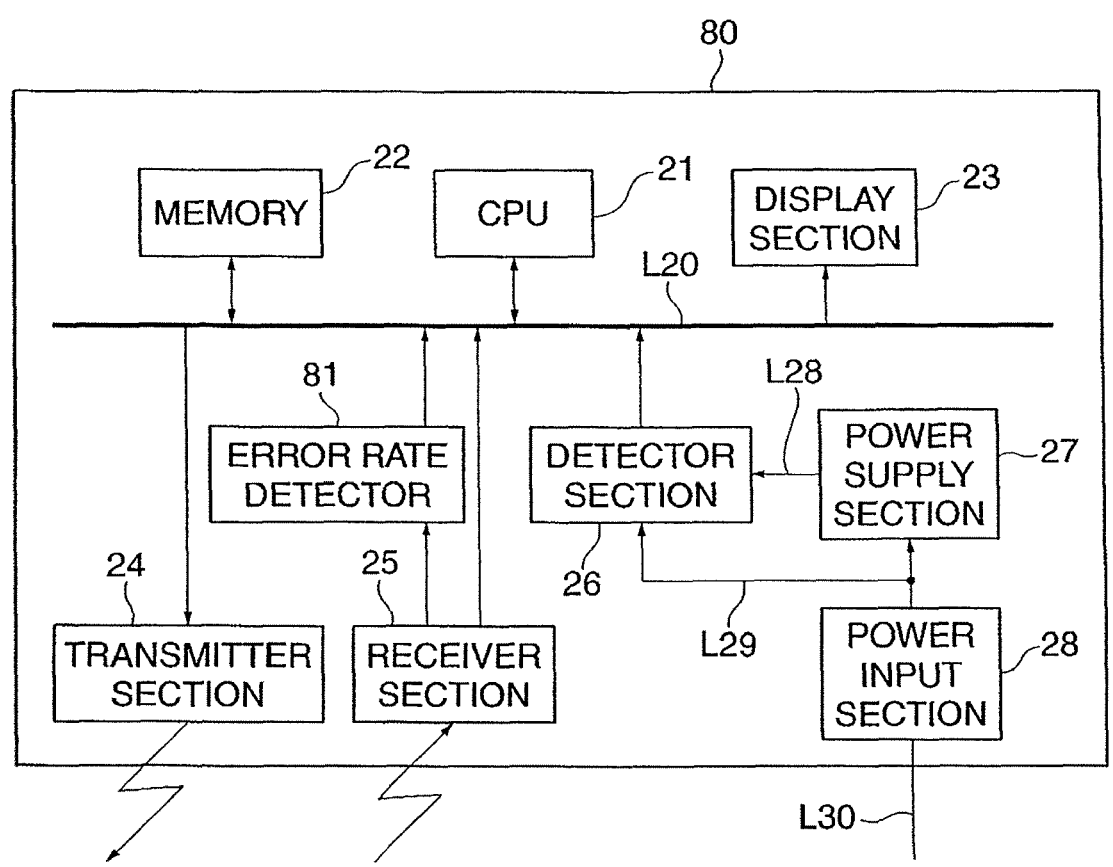
FIG. 8 is a block diagram showing the internal configuration of a bidirectional remote control unit according to a second embodiment of the present invention.

FIG. 8 is a block diagram showing the internal configuration of a bidirectional remote control unit according to the second embodiment. The bidirectional remote control unit in FIG. 8 is configured to be capable of bidirectionally communicating with a television set shown in FIG. 9. In FIG. 8, component elements corresponding to those of the bidirectional remote control unit in FIG. 1 are designated by identical reference numerals, and description thereof is omitted.

As shown in FIG. 8, the bidirectional remote control unit 80 includes an error rate detector 81. The error rate detector 81 detects the error rate of signals (including commands, video signals, and audio signals) from the television set. An error rate detected by the error rate detector 81 is sent to the CPU 21. The CPU 21 can recognize a state of transmission between the television set shown in FIG. 9 and the bidirectional remote control unit 80, based on the error rate detected by the error rate detector 81.

Figure 9:
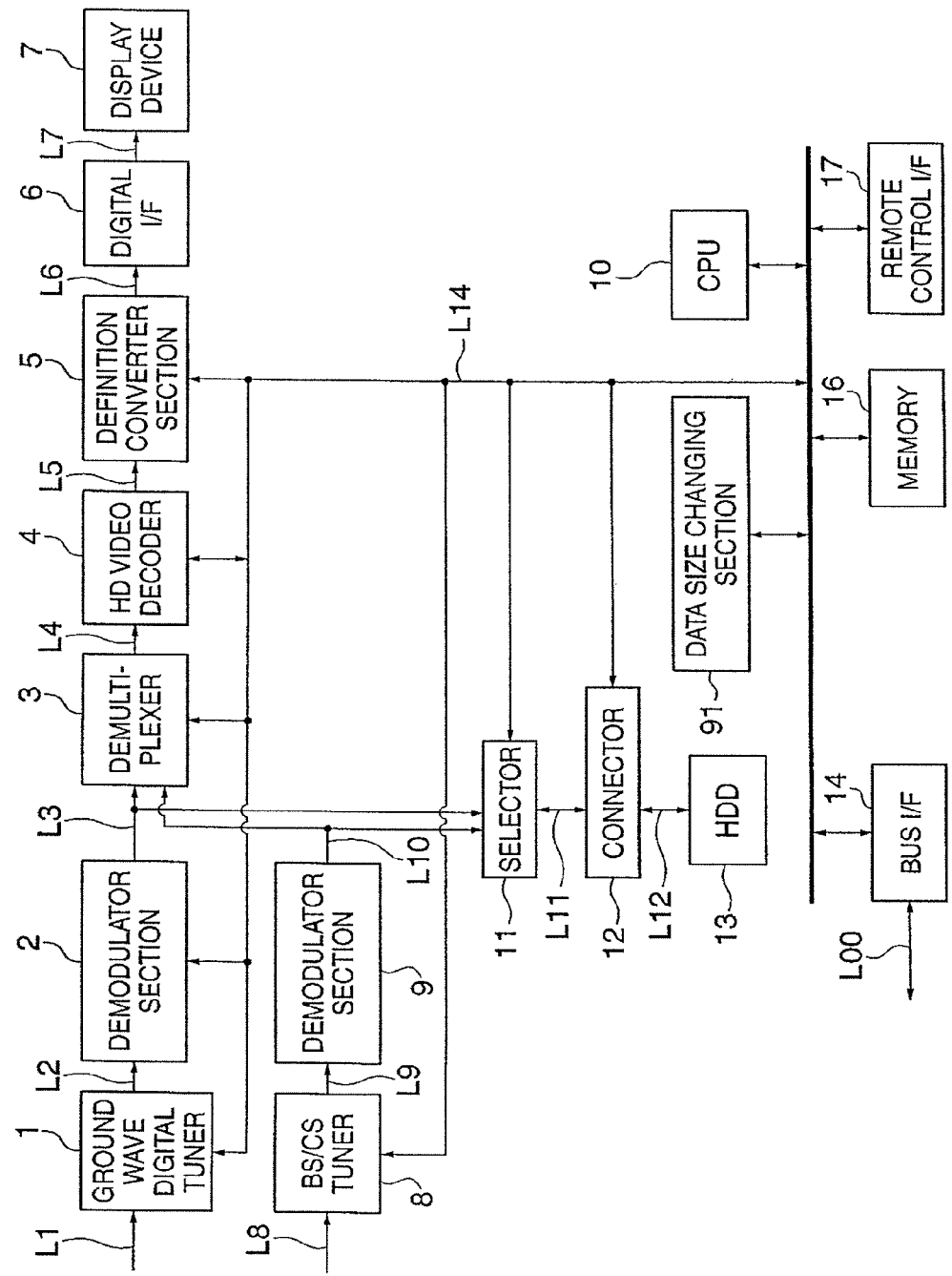
FIG. 9 is a block diagram showing the internal configuration of a television set operated by the bidirectional remote control unit in FIG. 8.

FIG. 9 is a block diagram showing the internal configuration of the television set operated by the bidirectional remote control unit in FIG. 8. In FIG. 9, component elements corresponding to those of the television set in FIG. 2 are designated by identical reference numerals, and description thereof is omitted.

A data size changing section 91 in FIG. 9 is configured to operate under the control of the CPU 10. The data size changing section 91 changes at least one of the bit rate, the definition, and the like of a video signal to be transmitted to the bidirectional remote control unit 80, to thereby reduce the data size of the video signal. When the video signal to be transmitted to the bidirectional remote control unit 80 is a moving image signal, only the bit rate thereof may be changed, while when the video signal is a still image signal, only the definition thereof may be changed. The data size changing section 91 may be configured to perform thinning-out of frames and/or pixels of a video signal to be transmitted to the bidirectional remote control unit 80.

Figure 10:
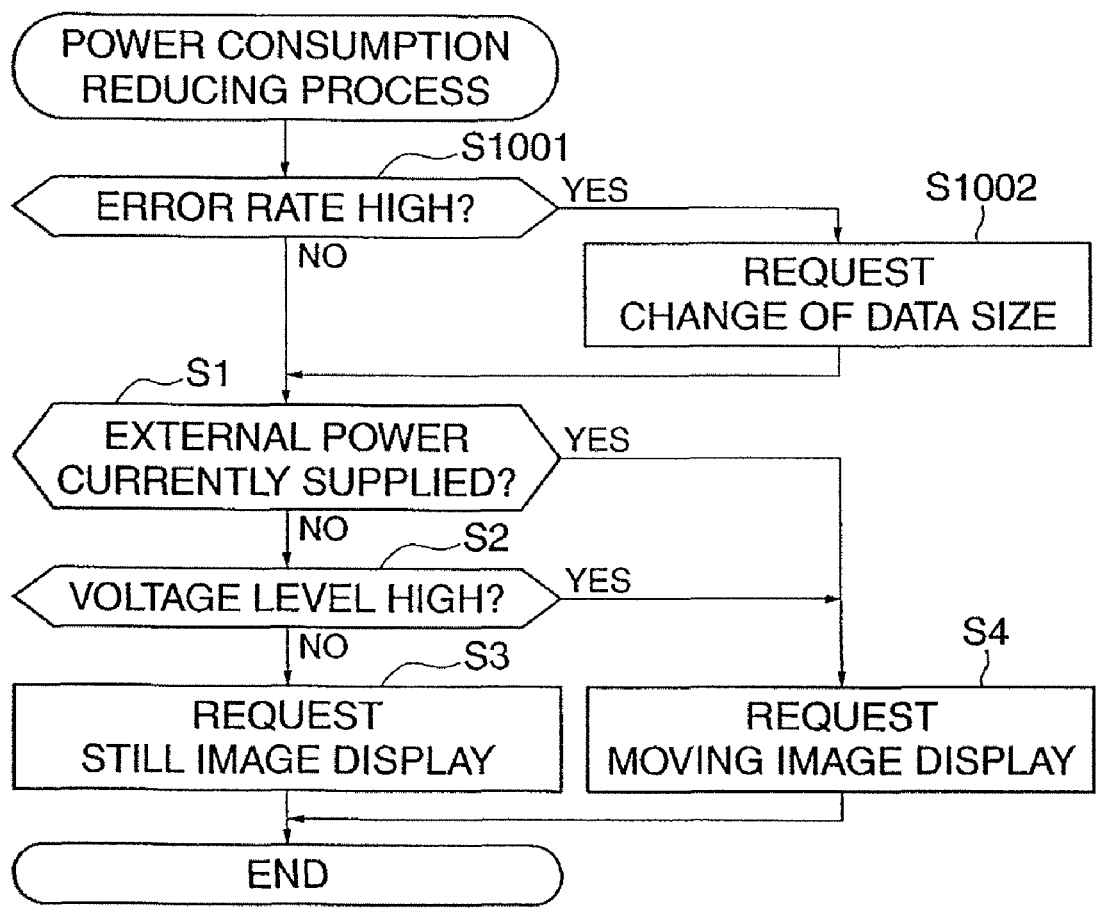
FIG. 10 is a flowchart showing a power consumption reducing process which is executed by the bidirectional remote control unit in FIG. 8.

FIG. 10 is a flowchart showing a power consumption reducing process which is executed by the bidirectional remote control unit in FIG. 8. The power consumption reducing process in FIG. 10 comprises the same parts of the power consumption reducing process in FIG. 3, and therefore description of the same parts of the process in FIG. 10 as the corresponding parts of the process in FIG. 3 is omitted.

As shown in FIG. 10, first, the error rate detector 81 of the bidirectional remote control unit 80 checks the error rate of a signal received by the receiver section 25. The error rate detector 81 constantly checks the error rate of a signal received by the receiver section 25, and informs the CPU 21 of the detected error rate. The CPU 21 determines whether or not the error rate detected by the error rate detector 81 has exceeded a predetermined value (step S1001). If the error rate detected by the error rate detector 81 has exceeded the predetermined value, it is determined that the state of transmission is degraded, and the process proceeds to a step S1002. Otherwise, the process proceeds to the step S1. When the process proceeds from the step S1001 to the step S1, it is determined that the state of transmission has recovered, and a request command for requesting an increase in the data size of a video signal to be transmitted from the television set may be sent to the television set.

When the process proceeds to the step S1002, the bidirectional remote control unit 80 transmits, from the transmitter section 24 to the television set, a request command for requesting the television set to reduce the data size of the video signal to be transmitted from the television set, so as to lower the error rate. At this time, the CPU 21 does not perform control for improving reception sensitivity, so as to reduce power consumption. When receiving this request command, the television set reduces the size of the video signal to be sent to the bidirectional remote control unit 80, using the data size changing section 91.

As described above, according to the power consumption reducing process in FIG. 10, when the error rate has exceeded the predetermined value, the data size of a video signal to be transmitted from the television set can be reduced, so that it is possible to reduce the power consumption of the bidirectional remote control unit 80. Further, processing executed in the steps S1 to S4 is identical to the power consumption reducing process in FIG. 3, and therefore it is possible to obtain the same advantageous effects as provided by the power consumption reducing process in FIG. 3.

Figure 11:
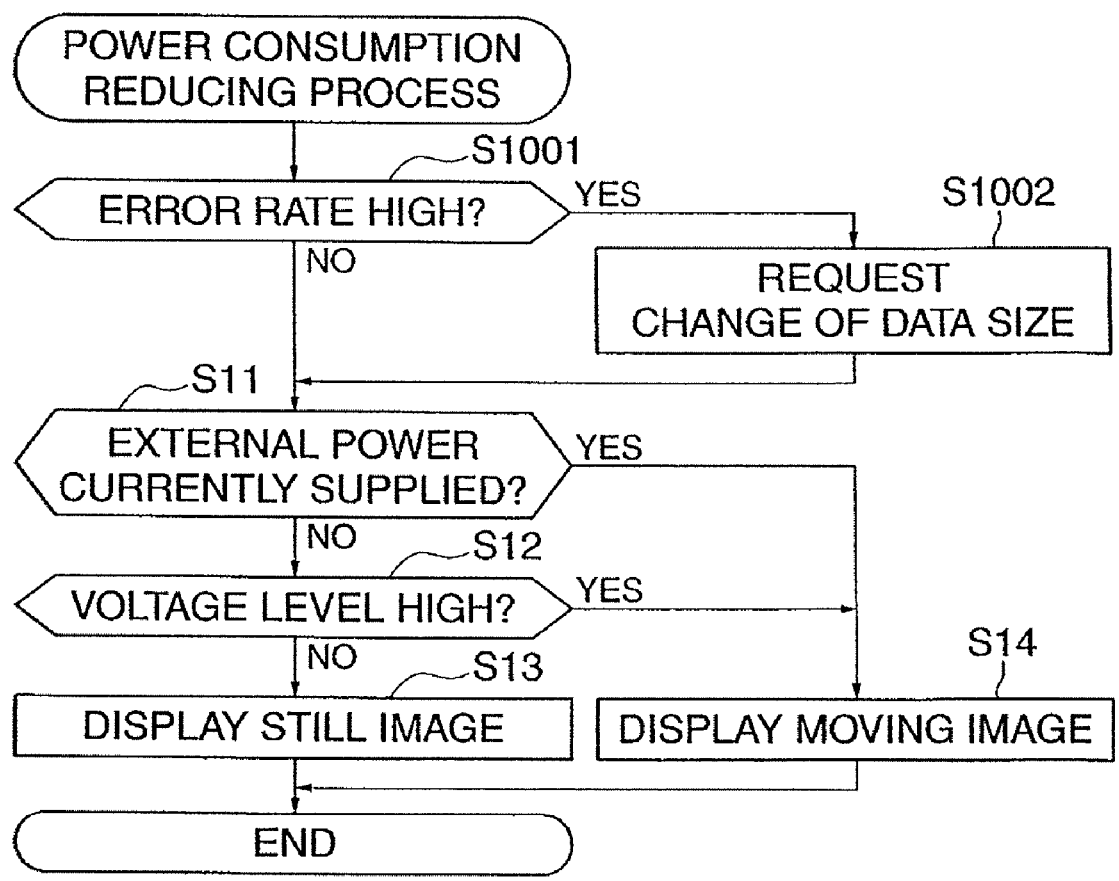
FIG. 11 is a flowchart showing a variation of the power consumption reducing process in FIG. 10.

FIG. 11 is a flowchart showing a variation of the power consumption reducing process in FIG. 10.

The power consumption reducing process in FIG. 11 is configured as a combination of the steps S1001 to S1002 in FIG. 10 and the steps S11 to S14 in FIG. 4. Therefore, the power consumption reducing process in FIG. 11 can provide the same advantageous effects as provided not only by the power consumption reducing process in FIG. 10, but also by the power consumption reducing process in FIG. 4.

Figure 12:
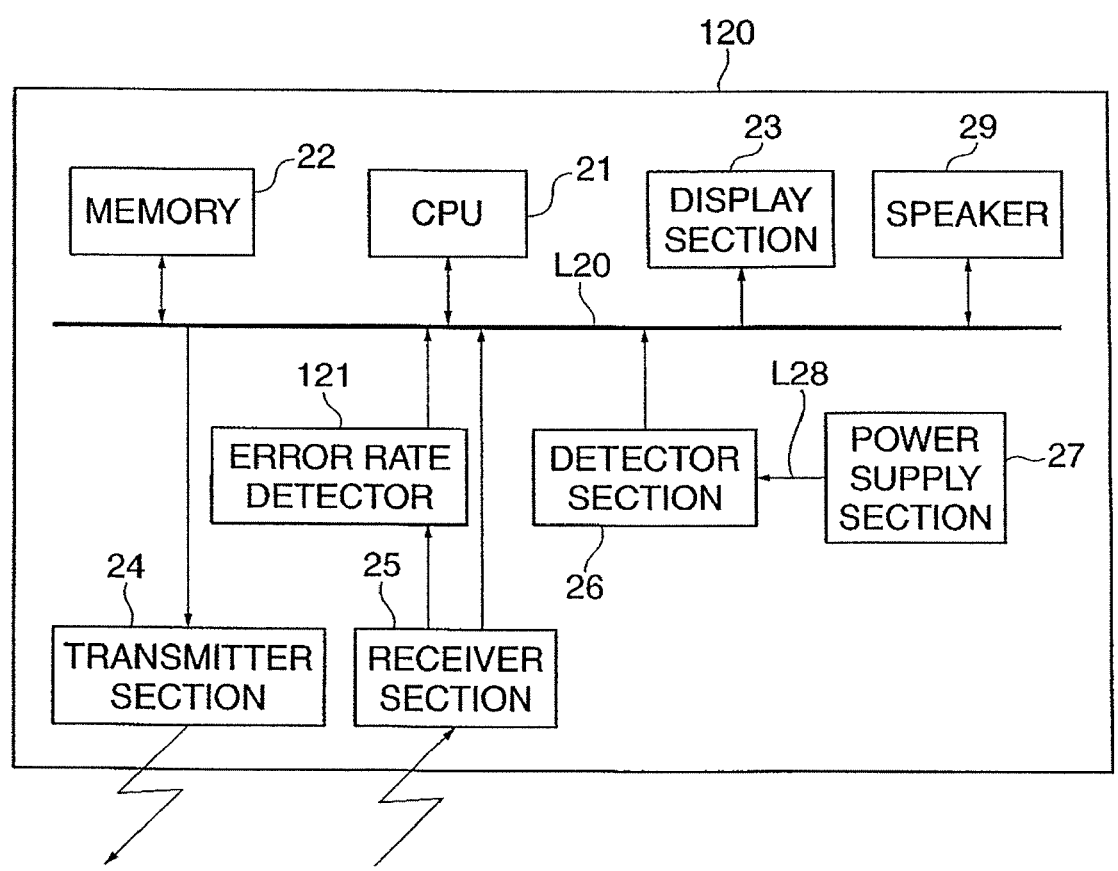
FIG. 12 is a block diagram showing the internal configuration of a variation of the bidirectional remote control unit in FIG. 5.

FIG. 12 is a block diagram showing the internal configuration of a variation of the bidirectional remote control unit in FIG. 5. Similarly to the bidirectional remote control unit in FIG. 8, the bidirectional remote control unit in FIG. 12 is configured to be capable of bidirectionally communicating with a television set shown in FIG. 9. In FIG. 12, component elements corresponding to those of the bidirectional remote control unit in FIG. 5 are designated by identical reference numerals, and description thereof is omitted.

As shown in FIG. 12, the bidirectional remote control unit 120 includes an error rate detector 121. The error rate detector 121 detects the error rate of signals (including commands, video signals, and audio signals) from the television set. An error rate detected by the error rate detector 121 is sent to the CPU 21. The CPU 21 can recognize the state of transmission between the television set shown in FIG. 9 and the bidirectional remote control unit 120, based on the error rate detected by the error rate detector 121.

Figure 13:
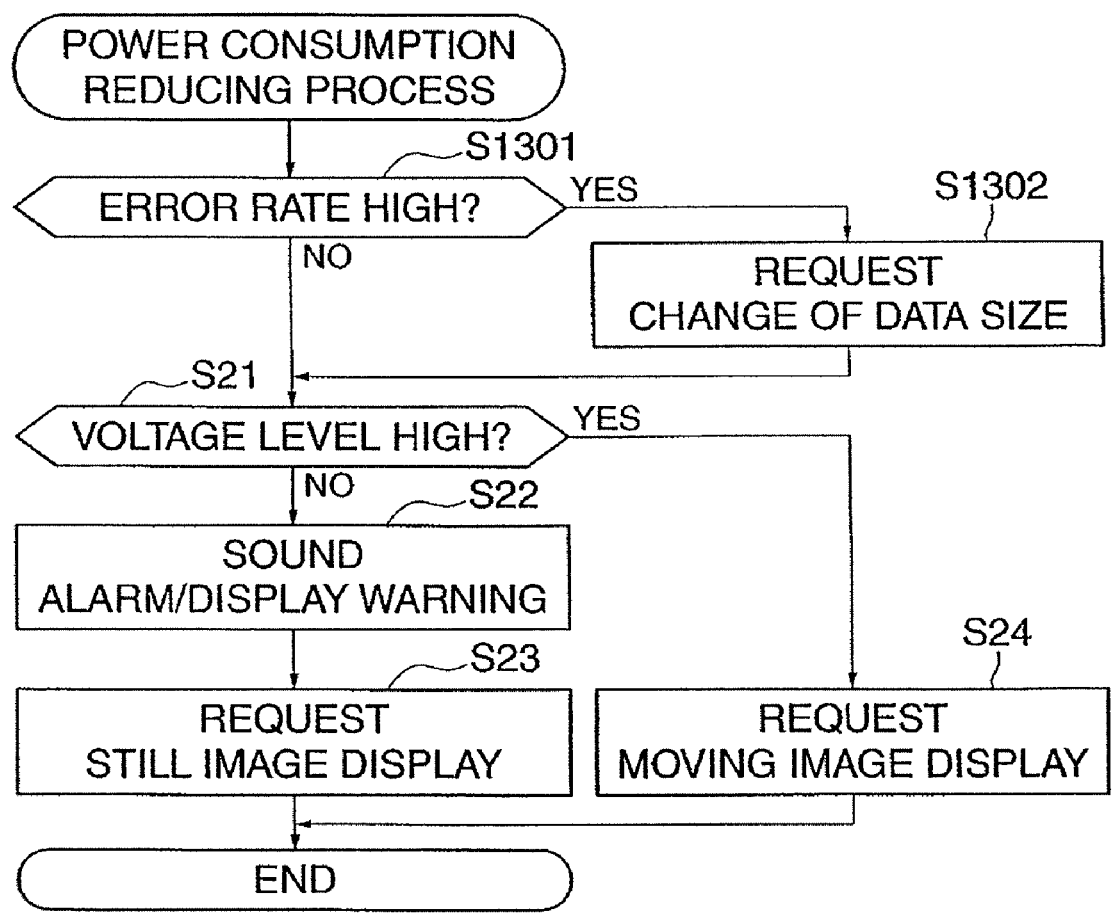
FIG. 13 is a flowchart showing a power consumption reducing process which is executed by the bidirectional remote control unit in FIG. 12.

FIG. 13 is a flowchart showing a power consumption reducing process which is executed by the bidirectional remote control unit in FIG. 12. The power consumption reducing process in FIG. 13 comprises the same parts of the power consumption reducing process in FIG. 6, and therefore description of the same parts of the process in FIG. 13 as the corresponding parts of the process in FIG. 6 is omitted.

As shown in FIG. 13, first, the error rate detector 121 in the bidirectional remote control unit 120 checks the error rate of a signal received by the receiver section 25. The error rate detector 121 constantly checks the error rate of a signal received by the receiver section 25, and informs the CPU 21 of the detected error rate. The CPU 21 determines whether or not the error rate detected by the error rate detector 121 has exceeded a predetermined value (step S1301). If the error rate detected by the error rate detector 121 has exceeded the predetermined value, it is determined that the state of transmission is degraded, and the process proceeds to a step S1302. Otherwise, the process proceeds to the step S21. When the process proceeding from the step S1301 to the step S21, it is determined that the state of transmission has recovered, and a request command for requesting an increase in the data size of a video signal to be transmitted from the television set may be sent to the television set.

When the process proceeds to the step S1302, the bidirectional remote control unit 120 transmits, from the transmitter section 24 to the television set, a request command for requesting the television set to reduce the data size of the video signal to be transmitted from the television set, so as to lower the error rate. At this time, the CPU 21 does not perform control for improving reception sensitivity, so as to reduce power consumption. When receiving this request command, the television set reduces the size of the video signal to be sent to the bidirectional remote control unit 120, using the data size changing section 91.

As described above, according to the power consumption reducing process in FIG. 13, when the error rate has exceeded the predetermined value, the data size of a video signal to be transmitted from the television set can be reduced, so that it is possible to reduce the power consumption of the bidirectional remote control unit 120. Further, processing executed in the steps S21 to S24 is identical to the power consumption reducing process in FIG. 6, and therefore it is possible to obtain the same advantageous effects as provided by the power consumption reducing process in FIG. 6.

Figure 14:
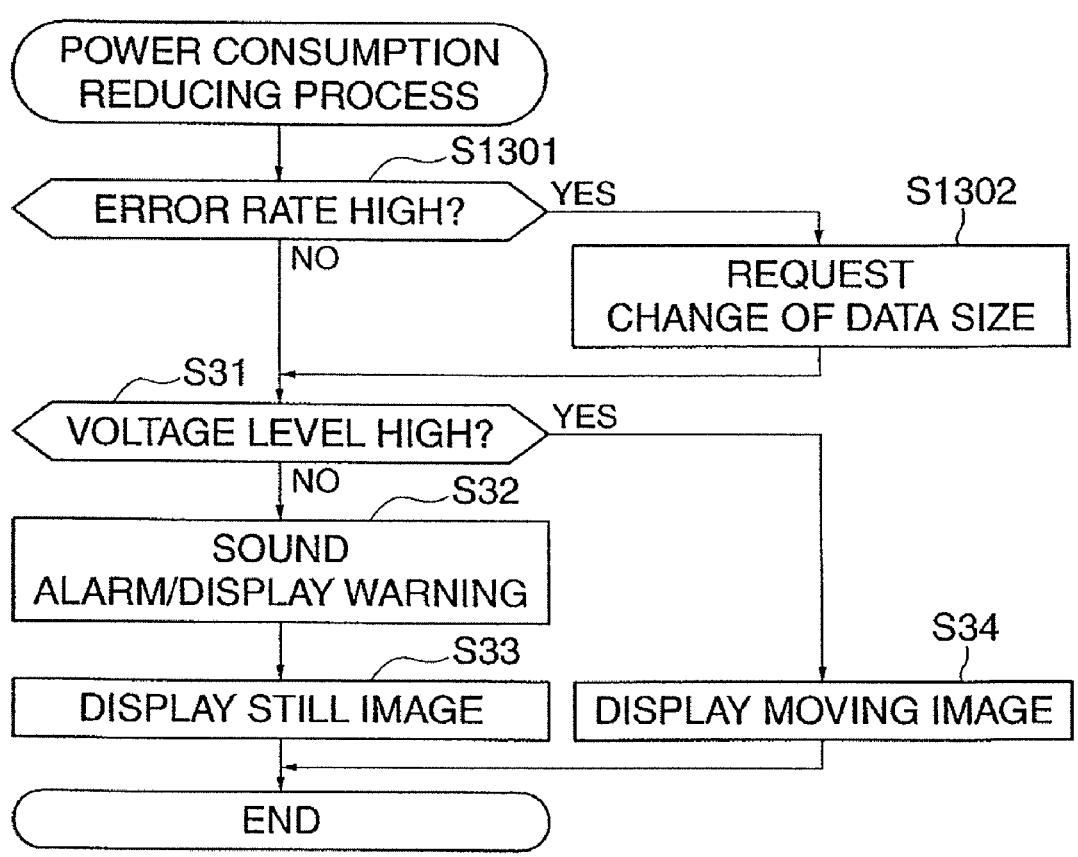
FIG. 14 is a flowchart showing a variation of the power consumption reducing process in FIG. 13.

FIG. 14 is a flowchart showing a variation of the power consumption reducing process in FIG. 13.

The power consumption reducing process in FIG. 14 is configured as a combination of the steps S1301 to S1302 in FIG. 13 and the steps S31 to S34 in FIG. 7. Therefore, the power consumption reducing process in FIG. 14 can provide the same advantageous effects as provided not only by the power consumption reducing process in FIG. 13, but also by the power consumption reducing process in FIG. 7.

The above-described embodiments are merely exemplary of the present invention, and are not be construed to limit the scope of the present invention.

The scope of the present invention is defined by the scope of the appended claims, and is not limited to only the specific descriptions in this specification. Furthermore, all modifications and changes belonging to equivalents of the claims are considered to fall within the scope of the present invention.

This application claims the benefit of Japanese patent application No. 2005-010450 filed Jan. 18, 2005, which is hereby incorporated by reference herein in its entirety.

What is claimed is:

1. A remote control unit capable of bidirectionally communicating with a controlled apparatus, the remote control unit comprising:
a display unit;
a detector unit that detects a voltage of a battery; and
a control unit that (a) determines whether or not a state of transmission between the controlled apparatus and the remote control unit is degraded or recovered, (b) controls the remote control unit to transmit a first command for requesting the controlled apparatus to reduce a data size of a moving image or still image, when the state of transmission between the controlled apparatus and the remote control unit is degraded, (c) controls the remote control unit to transmit a second command for requesting the controlled apparatus to increase the data size of the moving image or still image, when the state of transmission between the controlled apparatus and the remote control unit is recovered, (d) determines whether or not the remote control unit receives external power from an AC adapter or the battery after the first command or the second command is transmitted to the controlled apparatus, (e) controls the remote control unit to transmit a third command for requesting the controlled apparatus to transmit the moving image from the controlled apparatus to the remote control unit so that the remote control unit receives the moving image from the controlled apparatus and displays the moving image received from the controlled apparatus on the display unit, when the remote control unit receives the external power from the AC adapter, (f) controls the remote control unit to transmit the first third command so that the remote control unit receives the moving image from the controlled apparatus and displays the moving image received from the controlled apparatus on the display unit, when the remote control unit receives the external power from the battery and the voltage of the battery detected by the detector unit is not lower than a predetermined level, and (g) controls the remote control unit to transmit a fourth command for requesting the controlled apparatus to transmit the still image from the controlled apparatus to the remote control unit so that the remote control unit receives the still image from the controlled apparatus and displays the still image received from the controlled apparatus on the display unit, when the remote control unit receives the external power from the battery and the voltage of the battery detected by the detector unit is lower than the predetermined level.

2. The remote control unit according to claim 1, wherein the controlled apparatus includes a television set.

3. A method of controlling a remote control unit having a display unit and being capable of bidirectionally communicating with a controlled apparatus, the method comprising the steps of:
determining whether or not a state of transmission between the controlled apparatus and the remote control unit is degraded or recovered;
controlling the remote control unit to transmit a first command for requesting the controlled apparatus to reduce a data size of a moving image or still image, when the state of transmission between the controlled apparatus and the remote control unit is degraded;
controlling the remote control unit to transmit a second command for requesting the controlled apparatus to increase the data size of the moving image or still image, when the state of transmission between the controlled apparatus and the remote control unit is recovered;
determining whether or not the remote control unit receives external power from an AC adapter or a battery after the first command or the second command is transmitted to the controlled apparatus;
detecting a voltage of the battery;
controlling the remote control unit to transmit a third command for requesting the controlled apparatus to transmit the moving image from the controlled apparatus to the remote control unit so that the remote control unit receives the moving image from the controlled apparatus and displays the moving image received from the controlled apparatus on the display unit, when the remote control unit receives the external power from the AC adapter;
controlling the remote control unit to transmit the third command so that the remote control unit receives the moving image from the controlled apparatus and displays the moving image received from the controlled apparatus on the display unit, when the remote control unit receives the external power from the battery and the voltage of the battery detected in the detecting step is not lower than a predetermined level; and
controlling the remote control unit to transmit a fourth command for requesting the controlled apparatus to transmit the still image from the controlled apparatus to the remote control unit so that the remote control unit receives the still image from the controlled apparatus and displays the still image received from the controlled apparatus on the display unit, when the remote control unit receives the external power from the battery and the voltage of the battery detected in the detecting step is lower than the predetermined level.

4. The method according to claim 3, wherein the controlled apparatus includes a television set.

* * * * *